July 21, 1925.

C. L. COOK

PISTON PACKING

Filed Nov. 10, 1924

1,546,625

Inventor
C. Lee Cook
By
Attorney

Patented July 21, 1925.

1,546,625

UNITED STATES PATENT OFFICE.

CHARLES LEE COOK, OF LOUISVILLE, KENTUCKY, ASSIGNOR TO C. LEE COOK MANUFACTURING COMPANY, OF LOUISVILLE, KENTUCKY, A CORPORATION OF KENTUCKY.

PISTON PACKING.

Application filed November 10, 1924. Serial No. 748,988.

*To all whom it may concern:*

Be it known that I, CHARLES LEE COOK, a citizen of the United States, residing at Louisville, in the county of Jefferson and State of Kentucky, have invented certain new and useful Improvements in Piston Packings, of which the following is a specification.

The present invention relates to piston packings, and the object is to provide means that will prevent the unobstructed outward action of the packing rings toward the cylinder walls when subjected to the steam or other pressure bearing against the inner faces of the packing structure, and at the same time allowing these rings to expand as normal wear takes place.

Figure 2:
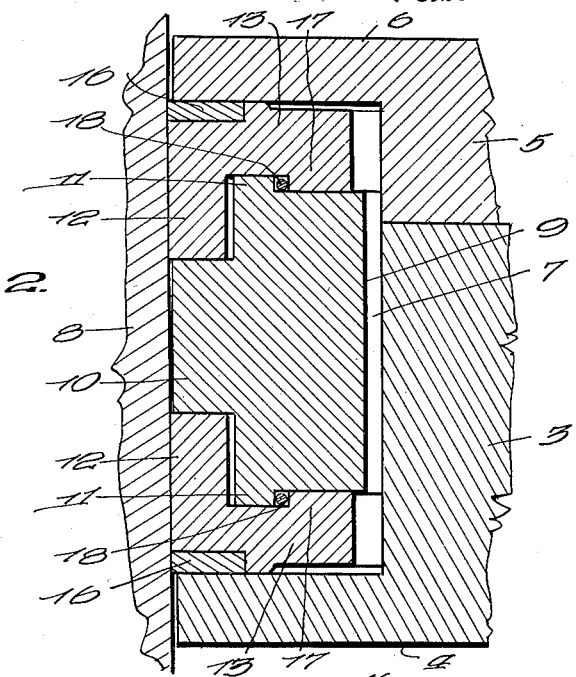
Figure 1:
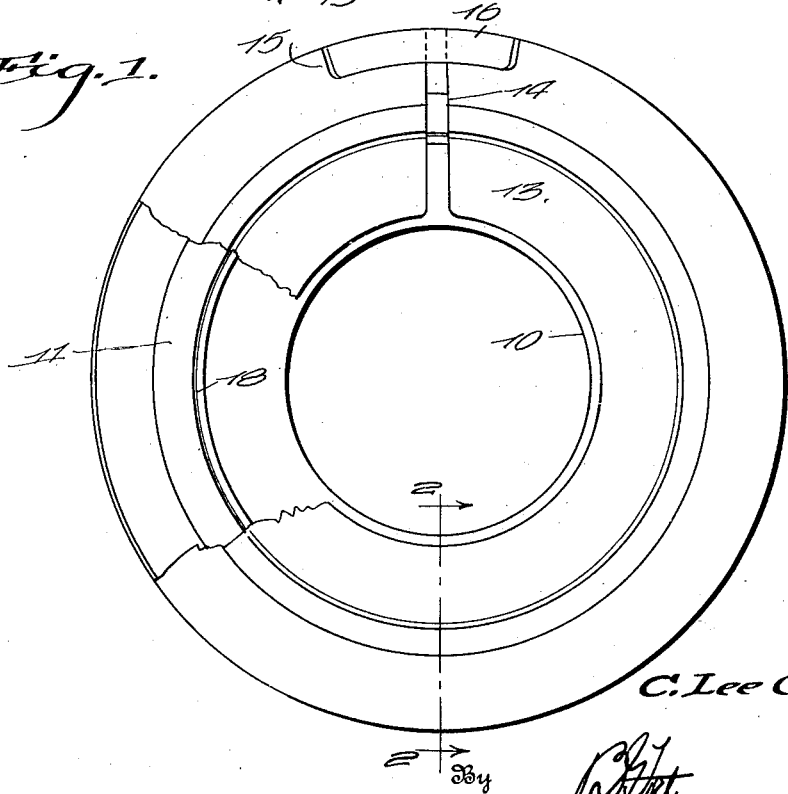

An embodiment of the invention that is at present considered the preferable one is illustrated in the accompanying drawings, wherein:

Figure 1 is a plan view of a packing constructed in accordance with the present invention, Figure 2 is a sectional view on the line 2—2 of Figure 1, but illustrating the packing in position in a piston.

In the disclosure a portion of a piston body is shown at 3, and includes an outstanding flange 4. A removable head portion 5 is provided with an outstanding flange 6 corresponding to the flange 4, thereby forming the usual annular recessed seat 7. A portion of the cylinder wall is illustrated at 8.

In the seat 7 is located a continuous "bull" or "junk" ring 9 having an outstanding central annular portion 10, and provided on its opposite sides with annular shoulders 11. Expansible packing rings 12 surround the bull ring on opposite sides of the extension 10, and have inwardly extending flange portions 13 that overlie the body of the bull or junk ring. These rings are split, as shown at 14, and recessed seats 15 formed in their end portions hold cover plates or bridge pieces 16 that extend across the joints 14. The packing rings 13 furthermore have inset annular shoulders 17 that are located inside or behind the shoulders 11 of the bull ring and are spaced therefrom. Holding rings 18 are interposed between the shoulders 11 and 17, and thus serve to limit the outward expansion of the packing rings 12. The rings 9 and 12 are preferably of hard material, the rings 12 being resilient as will be understood. The rings 18, however, are of softer material than the rings 9 and 12 and may be, for example, of copper. The arrangement is such that the ring 9 may have a slight lateral play in the recess 7 and the packing rings 12 will bear against the inner face of the cylinder 8 with sufficient force to form a steam tight joint, but the outward movement or expansion of the rings is limited by the interposition of the rings 18 which bear against the shoulders 11 of the bull ring and are in turn borne against by the shoulders 17 of the packing rings. As the outer faces of the rings 12 wear due to sliding contact with the cylinder wall, the steam pressure behind the packing rings plus the expansive force of said rings will gradually deform the holding rings cross sectionally, or in other words, mash them so that said rings 12 will expand to take up the wear occasioned. As a consequence while excessive friction is eliminated allowance is provided to insure a proper steam tight joint, the softness of the copper wire being maintained by the annealing action of the steam.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. A piston packing comprising a bull ring, an expansible packing ring associated therewith, and a holding element of material softer than the bull ring and packing ring and interposed between portions of the same, said members being deformed by being compressed between said portions of the rings due to the expansion of the packing ring.

2. A piston packing comprising a bull ring having a shoulder, an expansible packing ring surrounding the bull ring and having a shoulder in opposition to and spaced from the shoulder of the bull ring, and a member of material softer than said rings and interposed between the shoulders thereof, said rings on their relative movement causing the shoulders to deform the member.

3. A piston packing comprising a bull ring having an annular shoulder, an expansible packing ring surrounding the bull ring and having an annular shoulder in opposition to and spaced from the shoulder of the bull ring, and a ring of material softer than said rings and interposed between the shoulders thereof, said rings on their relative movement causing the shoulders to deform the ring of softer material.

4. A piston packing comprising a continuous bull ring having an outwardly extending annular shoulder on one side, an expansible packing ring surrounding the bull ring and having an inwardly extending flange portion overlying the said side and provided with an inset annular shoulder in opposition to and inside the shoulder of the bull ring, and a ring of softer material than the bull and packing rings and interposed between the shoulders.

5. The combination with a piston having an annular recessed seat, of a bull ring in the seat and having annular shoulders on its opposite sides, expansible packing rings in the seat surrounding the bull ring and having inwardly extending flange portions overlying the opposite sides of the bull ring and provided with inset annular shoulders inside and in opposition to the shoulders of the bull ring, and rings of material softer than the bull and packing rings and interposed between and adapted to be deformed cross sectionally by compression between said shoulders.

In testimony whereof, I affix my signature.

CHARLES LEE COOK.